US012420976B2

(12) United States Patent
Malone et al.

(10) Patent No.: US 12,420,976 B2
(45) **Date of Patent: *Sep. 23, 2025**

(54) INDICATOR ASSEMBLY FOR MEDIA PROCESSING DEVICES

(71) Applicant: ZEBRA TECHNOLOGIES CORPORATION, Lincolnshire, IL (US)

(72) Inventors: Morgan Hassan Malone, Swansea, MA (US); Edward Anthony Hackett, Surbiton (GB); Raymond E. Maynard, Westerly, RI (US); Michael F. St. Germain, West Warwick, RI (US); Michael C. Wondolowski, Carpinteria, CA (US); Daniel V. Carroll, Port Barrington, IL (US); Ozgur Ozserin, London (GB); James Roger Morley-Smith, Oxfordshire (GB); Hannah Marie Legg, London (GB); Roger Edward Guinee, Arlington Heights, IL (US); Ellen Thomas, London (GB)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/380,490

(22) Filed: Oct. 16, 2023

(65) Prior Publication Data

US 2024/0043159 A1 Feb. 8, 2024

Related U.S. Application Data

(63) Continuation of application No. 17/842,539, filed on Jun. 16, 2022, now Pat. No. 11,787,588, which is a
(Continued)

(51) Int. Cl.
*B32B 41/00* (2006.01)
*B65C 9/18* (2006.01)
*B65C 9/40* (2006.01)

(52) U.S. Cl.
CPC .................. *B65C 9/40* (2013.01); *B65C 9/18* (2013.01); *B65C 2210/0037* (2013.01)

(58) Field of Classification Search
CPC ..... B65C 9/40; B65C 9/18; B65C 2210/0037; B65C 11/02; H01H 2219/039;
(Continued)

(56) References Cited

U.S. PATENT DOCUMENTS

| | | | |
|---|---|---|---|
| 7,187,825 | B2 | 3/2007 | Lim et al. |
| 7,360,707 | B2 | 4/2008 | Barkan et al. |

(Continued)

FOREIGN PATENT DOCUMENTS

| | | | |
|---|---|---|---|
| EP | 2551726 | A2 | 4/2014 |
| WO | 2015174470 | A1 | 11/2015 |

OTHER PUBLICATIONS

Search Report for Belgian Patent Application No. BE 2021/5866 mailed on Jun. 9, 2022.

(Continued)

*Primary Examiner* — Michael N Orlando
*Assistant Examiner* — Joshel Rivera

(57) ABSTRACT

A printer includes: a body defining a media enclosure configured to receive a media supply; an indicator assembly supported by an outer wall of the body, the indicator assembly including a plurality of substantially contiguous illumination surfaces illuminated by respective ones of a set of lights supported within the body; a controller supported by the body, the controller configured to: (i) obtain an operational status of the printer, (ii) retrieve, from a mapping repository, a set of notification control parameters corresponding to the operational status, and (iii) control the set of lights according to the notification control parameters.

20 Claims, 6 Drawing Sheets

Related U.S. Application Data continuation of application No. 17/089,889, filed on Nov. 5, 2020, now Pat. No. 11,390,410.

(58) Field of Classification Search
CPC ..... H01H 2219/0622; H01H 2221/044; H01H 2233/036; H01H 13/023; H01H 13/83; B41J 29/46
USPC .................... 156/60, 64, 350, 351, 378, 379
See application file for complete search history.

(56) References Cited

U.S. PATENT DOCUMENTS

| | | | | |
|---|---|---|---|---|
| 9,287,724 | B2 | 3/2016 | Corvese et al. | |
| 9,982,780 | B2 | 5/2018 | Salter et al. | |
| 10,038,288 | B2 | 7/2018 | Choi et al. | |
| 11,390,410 | B2 * | 7/2022 | Malone | B65C 11/02 |
| 2006/0154725 | A1 | 7/2006 | Glaser et al. | |
| 2009/0122101 | A1 * | 5/2009 | Silverbrook | B41J 29/38 347/20 |
| 2013/0271259 | A1 | 10/2013 | Brasseur et al. | |
| 2014/0071194 | A1 | 3/2014 | Inokuchi et al. | |
| 2017/0071194 | A1 | 3/2017 | Petcavich | |

OTHER PUBLICATIONS

International Search Report and Written Opinion for International Application No. PCT/US2021/057981 mailed on Dec. 7, 2021.
IFixit, "Xbox 360 Wireless Controller Teardown", Jun. 1, 2019, https://www.ifixit.com/Teardown/Xbox+360+Wireless+Controller+Teardown/123908 (Year: 2019).

* cited by examiner

INDICATOR ASSEMBLY FOR MEDIA PROCESSING DEVICES

RELATED APPLICATION

This patent arises from a continuation of U.S. patent application Ser. No. 17/842,539, filed Jun. 16, 2022, which is a continuation of U.S. patent application Ser. No. 17/089,889, filed Nov. 5, 2020, both of which are incorporated by reference in their entirety.

BACKGROUND

A media processing device, such as a label printer, may have various of operational states to be presented to an operator. Devices for conveying such information to an operator, such as display panels, may be difficult to physically accommodate on the printer, and may also increase manufacturing costs and complexity.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
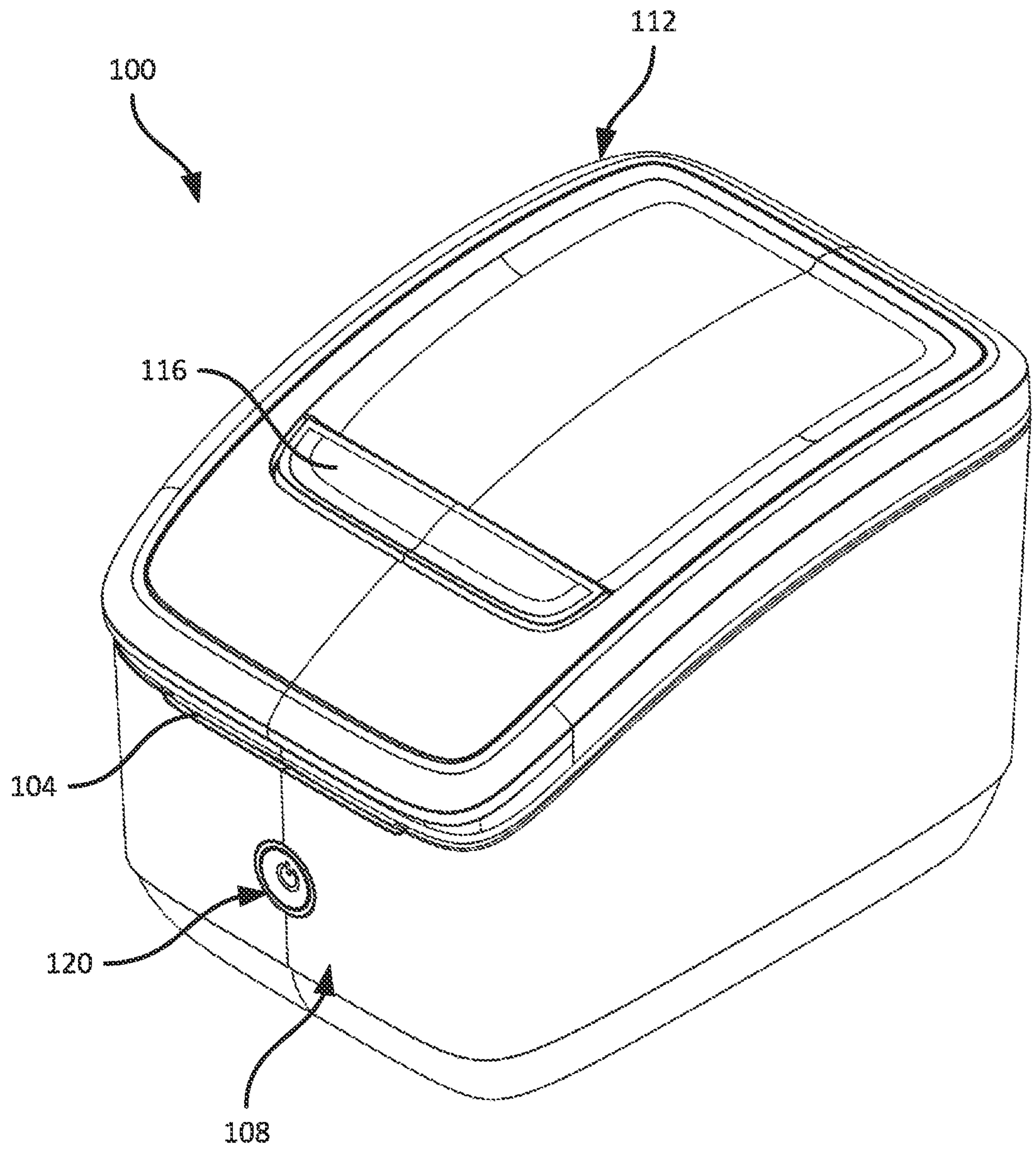
FIG. 1 is an isometric view of a printer.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Media processing devices, such as desktop label printers, contain a variety of subsystems. For example, a printer can include a media feed subsystem for drawing media from a supply such as a roll of labels, a printing subsystem for applying indicia to the labels, a communication subsystem configured to connect to local networks, and the like. Such subsystems may be in a variety of operational states during operation of the printer. For example, a media feed subsystem can be powered off, in an idle state, in an active state, in a jammed state, and the like.

At least some of the above operational states may be presented to an operator of the printer. Some printers, for example, employ indicator lights corresponding to specific operational states, to provide binary indicators of whether the state is active or not. For example, a printer may include a light indicating whether a wireless interface of the printer is connected or not. However, the number of potential operational states may be sufficiently great that accommodating each state with a distinct light on the housing of the printer is difficult.

Other mechanisms of conveying the above information to an operator, such as the use of a display panel, may enable the presentation of a greater variety of information, but may nevertheless be difficult to accommodate on the housing of the printer. Such mechanisms may also increase the cost and complexity of manufacturing the printer to an undesirable degree.

Examples disclosed herein are directed to a printer, comprising: a body defining a media enclosure configured to receive a media supply; an indicator assembly supported by an outer wall of the body, the indicator assembly including a plurality of substantially contiguous illumination surfaces illuminated by respective ones of a set of lights supported within the body; a controller supported by the body, the controller configured to: (i) obtain an operational status of the printer, (ii) retrieve, from a mapping repository, a set of notification control parameters corresponding to the operational status, and (iii) control the set of lights according to the notification control parameters.

Additional examples disclosed herein are directed to a printer, comprising: a body defining a media enclosure configured to receive a media supply; an indicator assembly supported by a forward wall of the body, the indicator assembly including: a set of lights supported within the body adjacent an opening in a forward wall of the body; and a barrel affixed in the opening, the barrel having (i) a set of illumination surfaces at a forward end thereof, and (ii) a corresponding set of light pipe extensions extending rearward into the body, each light pipe extension configured to receive light from one of the lights and direct the received light to a corresponding illumination surface.

FIG. 1 illustrates a media processing device 100, also referred to herein as a printer 100. The printer 100 can be, for example, a desktop label printer configured to accept media such as a roll of labels, and to apply indicia to the labels, which may then exit the printer 100 via an outlet 104. The outlet is defined at least in part by a body 108 of the printer 100. The body 108 includes a set of walls (e.g. a set of outer walls, visible in FIG. 1, and a set of inner walls) that house various components of the printer 100 and define an interior enclosure for accepting the above-mentioned media. The media may be received in the enclosure in the form of a cartridge containing a roll of labels, for example.

The printer 100 also includes a lid 112 movably coupled to the body 108. The lid 112 is movable between the closed position shown in FIG. 1, in which the above-mentioned enclosure for the media is enclosed, and an open position (not shown) permitting access to the enclosure. The lid 112 can include a latching mechanism activated by a button 116, for example, to retain the lid 112 in the closed position during operation of the printer 100.

The printer 100 further includes an indicator assembly 120 that includes a plurality of light-emitting surfaces, e.g.

illuminated by a corresponding set of lights (e.g. light-emitting diodes) housed within the body 108 of the printer 100. As will be discussed in greater detail below, the lights of the indicator assembly 120 are controllable to generate various visual notifications. The control of multiple lights, and the relative placements of the surfaces illuminated by the lights, enables the indicator assembly 120 to generate notifications representative of a greater number of operational states of the printer 100 than there are lights in the assembly 120.

Figure 2:
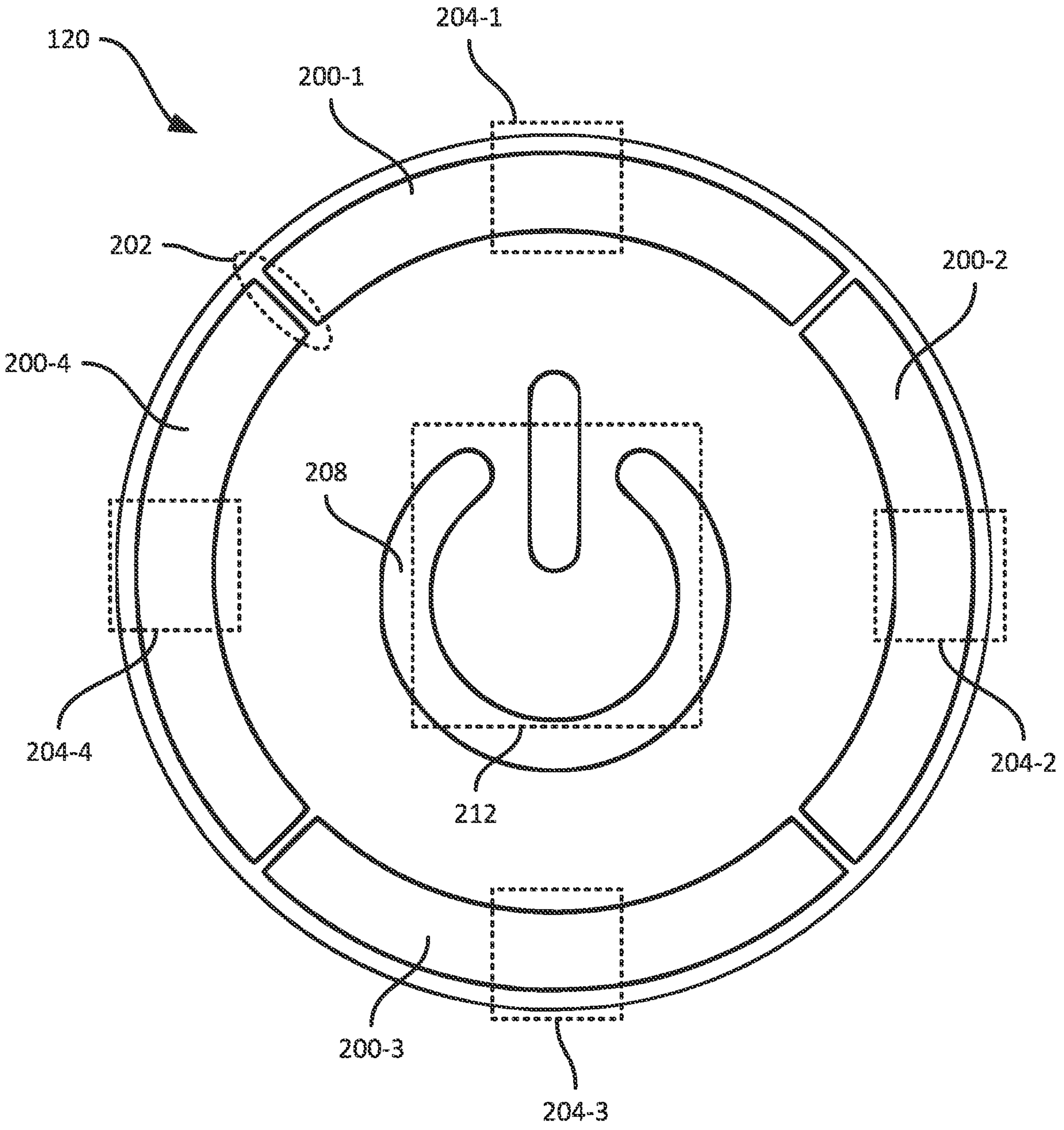
FIG. 2 is a front view of an indicator assembly of the printer of FIG. 1.

Turning to FIG. 2, a front view of the indicator assembly 120 in isolation is shown. The indicator assembly 120 includes a set of substantially contiguous illumination surfaces 200. In particular, in the illustrated example the assembly 120 includes four illumination surfaces 200-1, 200-2, 200-3, and 200-4. The surfaces 200 are arcs, e.g. each extending over an angle of about ninety degrees such that the surfaces 200 together form a ring. In other examples, however, other arrangements, and other numbers, of illumination surfaces 200 may be provided.

More generally, the surfaces 200 are said to be substantially contiguous because the area separating each adjacent pair of surfaces 200 (e.g. the area of the gap 202 between the surfaces 200-1 and 200-4) is significantly smaller than the area of the surfaces themselves. In the illustrated example, the gaps between surfaces 200 are less than one tenth of the area of each surface 200. In other examples, the surfaces 200 may be contiguous, i.e. with no gaps therebetween.

Each surface 200 is illuminated by a light such as an LED. In the present example, therefore, the assembly 120 also includes four lights 204-1, 204-2, 204-3, and 204-4, e.g. supported by a circuit board or other support element within the body 108 of the body 108. The assembly 120 can also include an additional illumination surface 208, e.g. disposed on a power button movably supported by the assembly 120 to turn the printer 100 on and off. The surface 208 is illuminated by a further light 212, e.g. supported on the above-mentioned circuit board.

Figure 3A:
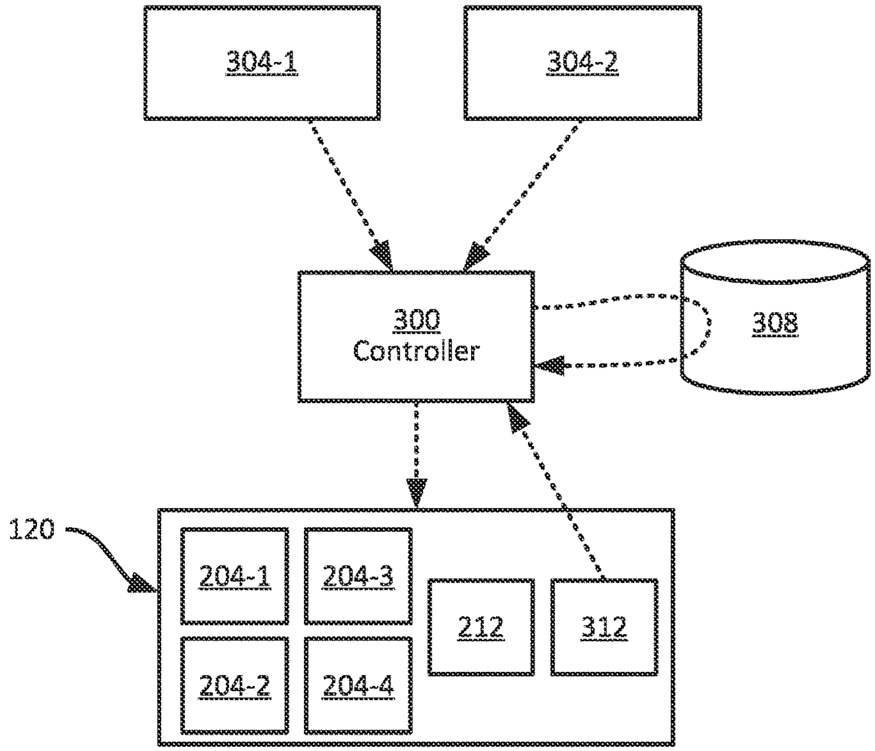
FIG. 3A is a diagram of certain internal components of the printer of FIG. 1.

Referring to FIG. 3, the assembly 120 is controlled by a controller 300 of the printer 100. The controller 300 can include any suitable integrated circuit or combination thereof, and may be configured to control various aspects of the printer 100 in addition to the assembly 120. To control the assembly 120, the controller 300 is configured to obtain an operational status of the printer 100. The operational status is obtained by, for example, monitoring the status of a variety of other subsystems 304-1, 304-2, etc., of the printer 100. For example, the subsystem 304-1 can include a communication interface such as a wireless transceiver, and the subsystem 304-2 can include a media feed subsystem configured to draw media from a supply such as a roll to a printhead.

The controller 300 is configured to monitor the subsystems 304 for events or other state information, such as indications that a subsystem is operating, is idle, has encountered an error, and the like. Responsive to obtaining such information (i.e. an operational state), the controller 300 is configured to retrieve, from a mapping repository 308, a set of notification control parameters corresponding to the operational status. The repository 308 can be stored at the controller 300 itself, or in a distinct storage element such as a memory circuit or other non-transitory computer-readable medium.

The repository 308 contains, for each operational state, a set of notification control parameters. Each set of notification control parameters, in turn, includes a power state for each of the lights 204 and 212, e.g. specifying whether the relevant light is to be enabled or disabled (and, in some examples a brightness level). Each set of notification control parameters may also include additional control parameters such as colors of illumination, duration and/or patterns of illumination (e.g. flashing and the like).

Each set of notification control parameters can be stored in the repository 308 in conjunction with an operational state identifier. For example, each operational state of the printer 100 may correspond to a particular operational state identifier, such that the operational states correspond to respective values in a predefined range (e.g. 0 to 63, for a total of 64 operational states). The repository 308 stores each set of notification control parameters in conjunction with a given operational state identifier, and the controller 300 therefore retrieves the notification control parameters that correspond to a currently obtained operational state identifier. As will be apparent, each set of notification control parameters need not be distinct from the others. For example, more than one operational status may correspond to identical notification control parameters. In such instances, a single set of notification control parameters can be stored in association with multiple operational state identifiers, or the repository 308 may simply contain more than one set of identical notification control parameters, each corresponding to a different operational state identifier.

Having retrieved the notification control parameters, the controller 300 is configured to control the lights 204 and/or 212 according to the notification control parameters. Referring to FIG. 5B, two example results of such control are illustrated. For example, in response to a first operational status, as shown on the left side of FIG. 3B, the surface 208 is illuminated in a first color (e.g. to show that the printer 100 is powered on), the surfaces 200-1 and 200-3 are illuminated in a second color, while the surfaces 200-2 and 200-4 are not illuminated. In a further example, as shown on the right side of FIG. 3B, the surface 208 is illuminated in the first color mentioned above, and all four surfaces 200 are illuminated in a third color (i.e. distinct from the second color shown in the first example).

Returning to FIG. 3A, the assembly 120 also includes a power button 312, configured to provide a signal to the controller 300 in response to being depressed (e.g. by opening or closing a circuit of the printer 100), e.g. to turn the printer 100 on or off.

Figure 3B:
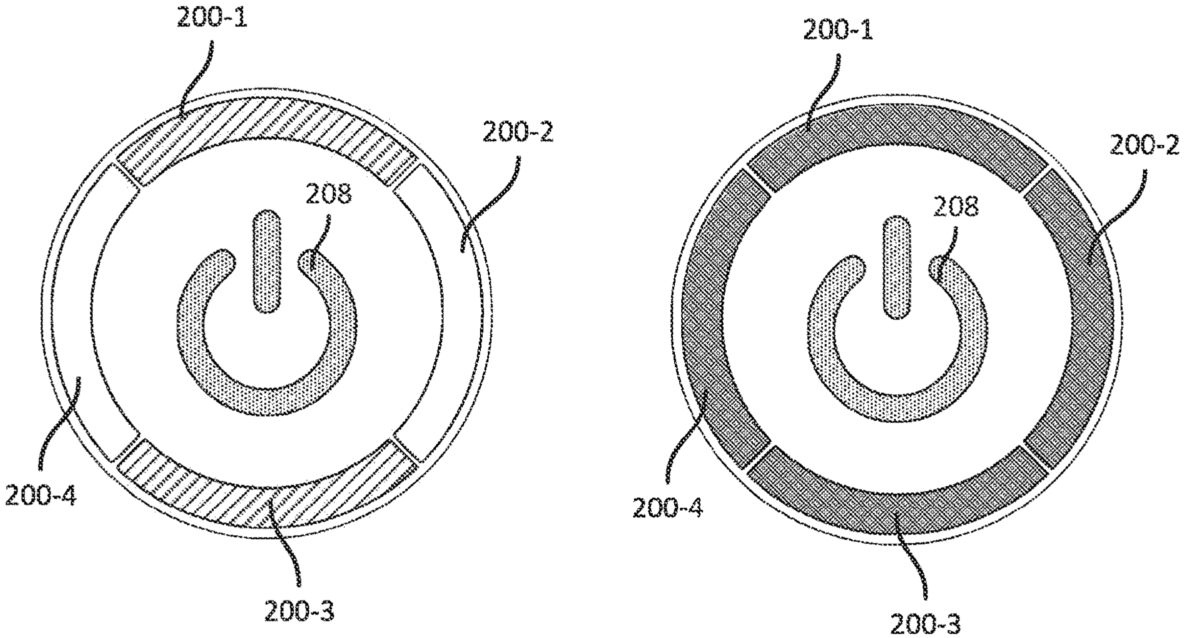
FIG. 3B is a diagram illustrating example notifications generated by the indicator assembly of FIG. 2.

In order to control the lights 204 to illuminate the surfaces 200, and the light 212 to illuminate the surface 208, in a plurality of distinct patterns such as those shown in FIG. 3B, the assembly 120 also includes various structural features to isolate the surfaces 200 and 208 from one another sufficiently to reduce or prevent light leakage from a given light 204 or 212 to a surface 200 or 208 other than the surface that corresponds to that light. An example structure of the assembly 120 is described below.

Figure 4:
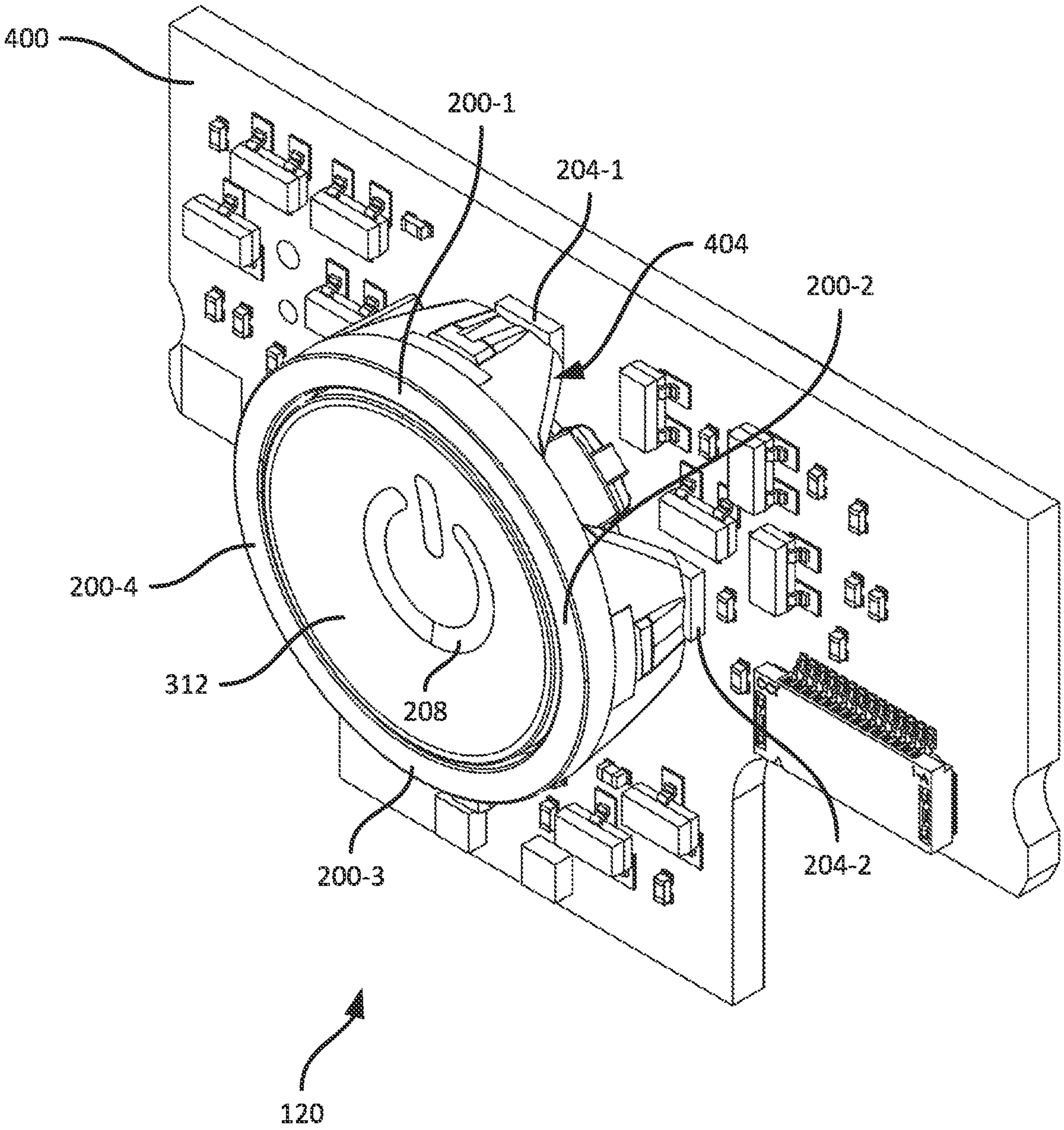
FIG. 4 is an isometric view of the indicator assembly shown in isolation.

Turning to FIG. 4, an isometric view of the assembly 120 is shown, along with a support member 400 supported within the body 108 of the printer 100. The body 108 itself is omitted in FIG. 4. In addition to the surfaces 200 and 208, two of the lights 204 (specifically, the lights 204-1 and 204-2) are visible, disposed on the support member 400. The lights 204 are adjacent to corresponding portions of a barrel 404 of the assembly 120. The barrel 404, as will be discussed in greater detail below, both supports additional components of the assembly 120 and directs light from the lights 204 to the surfaces 200. The surfaces 200 are provided by the barrel 404, e.g. at a forward end of the barrel 404, in this example.

Figure 5A:
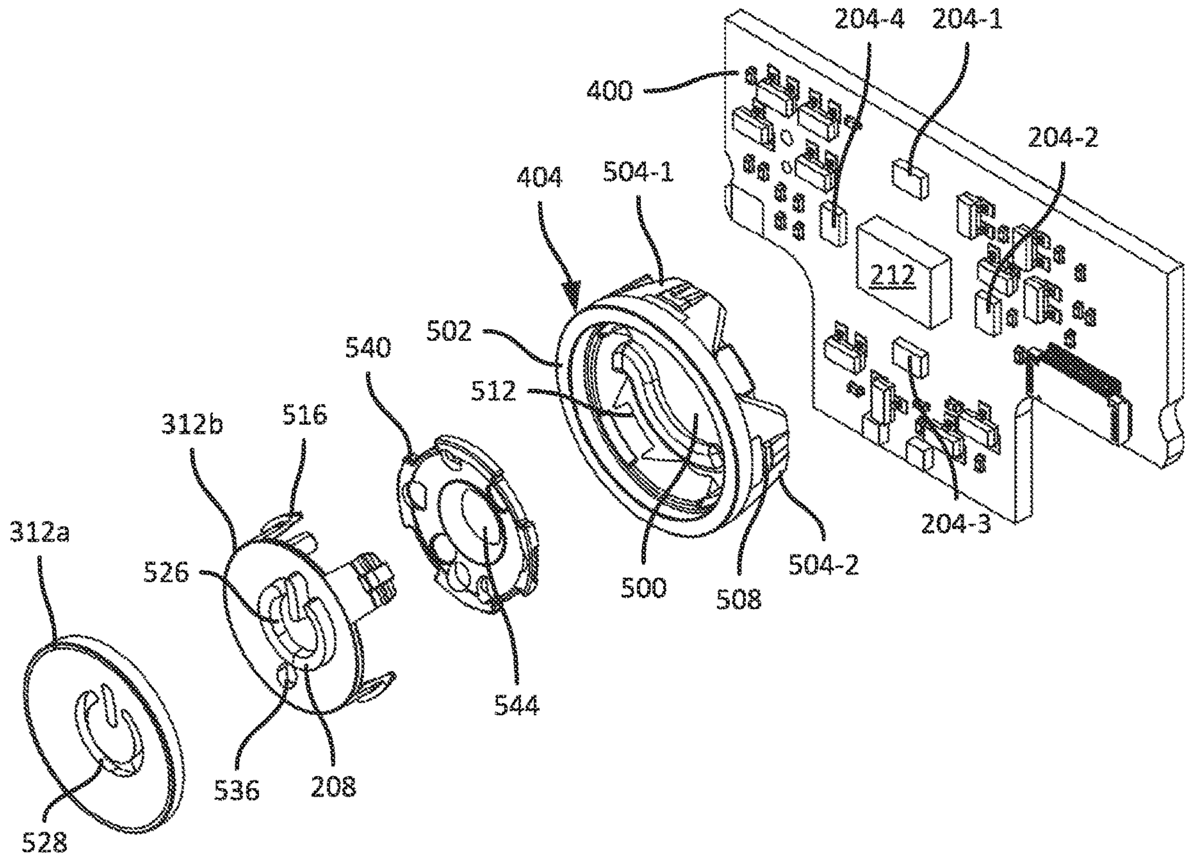
FIG. 5A is an exploded view of the indicator assembly of FIG. 4, viewed from the front.
Figure 5B:
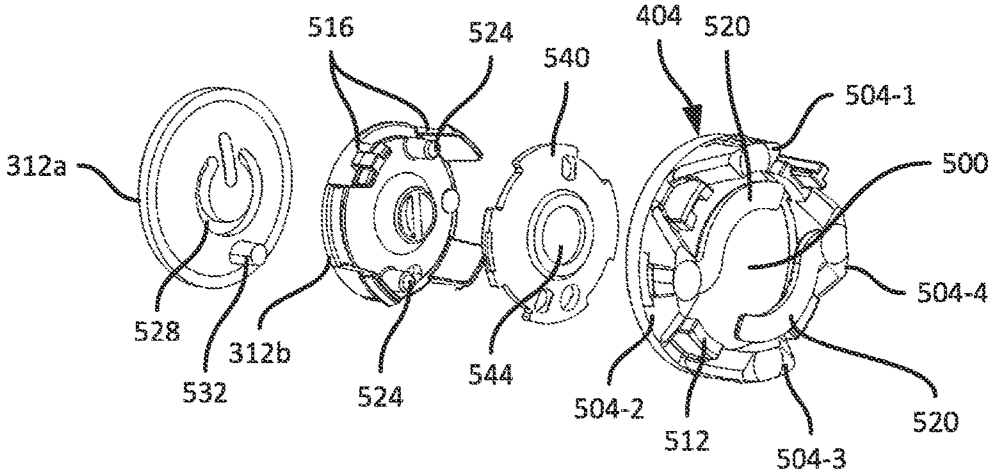
FIG. 5B is an exploded view of the indicator assembly of FIG. 4, viewed from the rear.

Referring to FIGS. 5A and 5B, exploded views of the assembly 120 are shown from the front (FIG. 5A) and the rear (FIG. 5B), with the rear view omitting the support member 400 and lights 204 and 212. The barrel 404, as seen in FIGS. 5A and 5B, is a generally cylindrical structure defining a channel 500 therethrough. As will be apparent in the discussion below, certain other components of the assembly 120 are movably supported within the channel 500, and the channel 500 additionally permits light from light 212 to reach the surface 208.

The surfaces 200 are defined by an outer, or forward, end 502 of the barrel 404, as also shown in FIG. 4. The barrel 404 includes a set of light pipe extensions 504-1, 504-2, 504-3, and 504-4, corresponding to the surfaces 200. At least the extensions 504 and the end 502 of the barrel 404 are translucent to permit the passage of light. In the present example, the entire barrel 404 is translucent. As seen in FIG. 5A (and also in FIG. 4), the extensions 504 are each disposed adjacent to a corresponding light 204, to collect light emitted by the corresponding light 204 and direct (e.g. via internal reflection) the light to the corresponding surface 200 at the end 502 of the barrel 404.

As seen in FIGS. 5A and 5B, the extensions 504 are generally wedge-shaped, increasing in size from the rear ends (adjacent to the lights 204) toward the front end 502 of the barrel 404.

The barrel 404 also includes an external set of snap-fit features 508, such as ledges extending from the barrel 404 (in the present example, the ledges extend from the sides of the light pipe extensions 504), to engage with the body 108 of the printer 100 and retain the assembly 120 within the body 108, as shown in FIG. 1. The barrel 404 further includes a set of internal snap features 512, to engage with corresponding hook features of the power button 312. In particular, the power button 312, which in the present example is implemented as an outer, or forward, button 312*a* and an inner, or rearward, button 312*b*, includes a set of four hooks 516 configured to engage with respective ones of the snap features 512 to limit the outward range of motion of the power button 312 within the channel 500. That is, the hooks 516 permit the button 312 to move into the channel 500 (toward the support member 400), as well as back out of the channel 500 to a maximum extent defined by the hooks 516. The power button 312 is therefore movable within the channel 500, over a range of motion whose forward extent is determined by the hooks 516.

The barrel 404 further includes a bias member 520 configured to bias the power button 312 towards an extended, or forward, position. In particular, in the illustrated example the barrel 404 includes two bias members 520 in the form of springs extending into the channel 500. The bias members 520 are resiliently deformable, allowing the power button 312 to move into the channel 500 towards the support member 400 in response to pressure applied to the power button 312. When such pressure is released, the bias members 520 push the power button 312 back towards a resting extended position. Contact between the power button 312 and the bias members 520, in this example, is established by a set of posts 524 extending from a rear surface of the rear button 312*b*.

The rear button 312*b* of the power button 312 is a translucent component that defines the surface 208 on an extrusion 526 extending forward from the button 312*b*. The forward button 312*a* is an opaque component with a cutout 528 to receive the extrusion 526, such that the surface 208 is substantially flush with a forward surface of the button 312*a*. The buttons 312*a* and 312*b* may be affixed to one another via a press-fit mechanism, such as a post 532 on the button 312*a* configured to engage with an opening 536 of the button 312*b*.

In some examples, the assembly 120 can also include a shield 540 configured to reduce light leakage between the button 312*b* and the barrel 404 such that the light 212 does not illuminate the surfaces 200, and the lights 204 do not illuminate the surface 208. The shield 540 is therefore an opaque component, and may be mounted to a rear surface of the button 312*b* by the posts 524 mentioned earlier. The posts 524 can extend through openings in the shield 540 to press-fit the shield 540 onto the button 312*b*. The shield 540 additionally defines an aperture 544 therethrough, allowing light from the light 212 to reach the button 312*b*.

Figure 6:
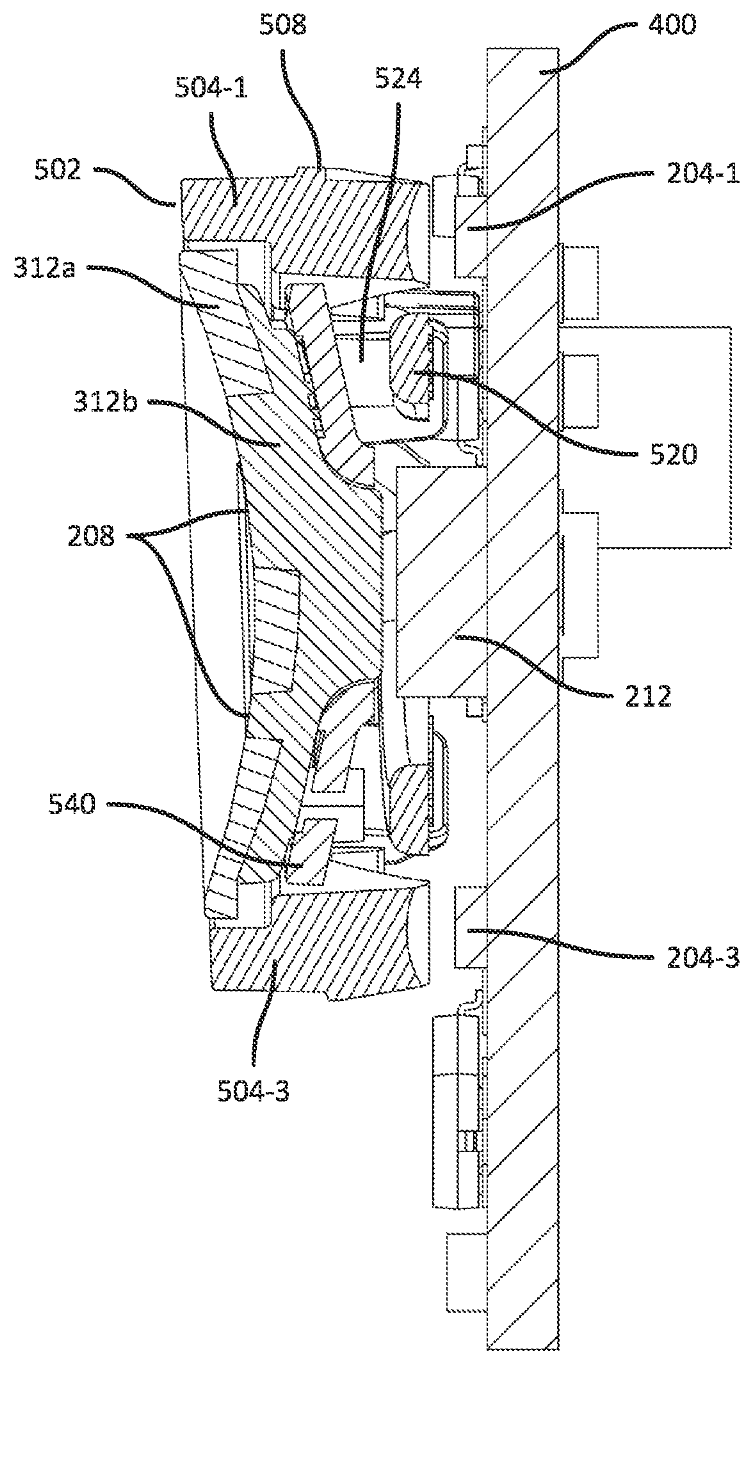
FIG. 6 is a cross sectional view of the indicator assembly of FIG. 4.

Turning to FIG. 6, a cross section the assembly 120 is shown. As seen in FIG. 6, the lights 204 are disposed adjacent to respective light pipe extensions 504, while the light 212 is disposed adjacent to the rear button 312*b* (which therefore acts as a light pipe for the light 212). The shield 540, meanwhile, reduces the amount of light that can escape from the extensions 504 and reach the rear button 312*b*, or vice versa. Further, the power button subassembly comprising the buttons 312*a* and 312*b* (as well as the shield 540, which moves with the power button 312) are enabled to slide within the channel 500 on the bias members 520.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A printer, comprising:

a body defining a media enclosure configured to receive a media supply;

a subsystem disposed within the housing, the subsystem configured to perform one or more printer functions;

an indicator assembly supported by an outer wall of the body, the indicator assembly including a power button and a plurality of illumination surfaces disposed about a perimeter of the power button to surround the power button, the plurality of illumination surfaces are continuously formed as a ring around the power button, the indicator assembly configured to be illuminated by lights supported within the body; and a controller supported by the body, the controller configured to output a notification corresponding to a status of the one or more printer functions via the illumination surfaces of the indicator assembly by controlling the lights.

2. The printer of claim 1, wherein each of the plurality of illumination surfaces are separated from adjacent ones of the plurality of illumination surfaces by less than one tenth of the area of each of the plurality of illumination surface.

3. The printer of claim 1, wherein the controller is configured to monitor the subsystem for state information.

4. The printer of claim 3, wherein the state information includes whether the subsystem is operating, idle, or has encountered an error.

5. The printer of claim 3, wherein in response to obtaining the state information, the controller is configured to retrieve, from a mapping repository, a set of notification control parameters corresponding to the state information from a plurality of sets of notification control parameters.

6. The printer of claim 5, wherein each of the plurality of sets of notification control parameters includes a power state for each of the lights.

7. The printer of claim 5, wherein each of the plurality of sets of notification control parameters include control parameters specifying at least one of a color of illumination, a duration of illumination, or a pattern of illumination for the lights.

8. The printer of claim 5, the controller is configured to control the lights according to the notification control parameters.

9. The printer of claim 8, wherein, in response to a first operational status, a first one of the plurality of illumination surfaces is illuminated in a first color, at least a second one of the plurality of illumination surfaces is illuminated in a second color, and at least a third one of the plurality of illumination surfaces is not illuminated.

10. The printer of claim 1, wherein the indicator assembly comprises:

a barrel affixed in the opening, the barrel defining the set of illumination surfaces at a forward end thereof, and a corresponding set of light pipe extensions extending rearward into the body, each light pipe extension configured to receive light from one of the lights and direct the received light to a corresponding one of the illumination surfaces.

11. A printer, comprising:

a body defining a media enclosure configured to receive a media supply;

a subsystem disposed within the housing, the subsystem configured to perform one or more printer functions;

an indicator assembly supported by an outer wall of the body, the indicator assembly including a power button and a plurality of illumination surfaces disposed about a perimeter of the power button to surround the power button, the indicator assembly configured to be illuminated by lights supported within the body; and a controller supported by the body, the controller configured to output a notification corresponding to a status of the one or more printer functions via the illumination surfaces of the indicator assembly by controlling the lights, wherein each of the plurality of illumination surfaces are separated from adjacent ones of the plurality of illumination surfaces by less than one tenth of the area of each of the plurality of illumination surface.

12. The printer of claim 11, wherein the plurality of illumination surfaces are continuously formed as a ring around the power button.

13. The printer of claim 11, wherein the controller is configured to monitor the subsystem for state information.

14. The printer of claim 13, wherein the state information includes whether the subsystem is operating, idle, or has encountered an error.

15. The printer of claim 13, wherein in response to obtaining the state information, the controller is configured to retrieve, from a mapping repository, a set of notification control parameters corresponding to the state information from a plurality of sets of notification control parameters.

16. The printer of claim 15, wherein each of the plurality of sets of notification control parameters includes a power state for each of the lights.

17. The printer of claim 15, wherein each of the plurality of sets of notification control parameters include control parameters specifying at least one of a color of illumination, a duration of illumination, or a pattern of illumination for the lights.

18. The printer of claim 15, the controller is configured to control the lights according to the notification control parameters.

19. The printer of claim 18, wherein, in response to a first operational status, a first one of the plurality of illumination surfaces is illuminated in a first color, at least a second one of the plurality of illumination surfaces is illuminated in a second color, and at least a third one of the plurality of illumination surfaces is not illuminated.

20. The printer of claim 11, wherein the indicator assembly comprises:

a barrel affixed in the opening, the barrel defining the set of illumination surfaces at a forward end thereof, and a corresponding set of light pipe extensions extending rearward into the body, each light pipe extension configured to receive light from one of the lights and direct the received light to a corresponding one of the illumination surfaces.

* * * * *